United States Patent [19]

Persson

[11] Patent Number: 5,442,635
[45] Date of Patent: Aug. 15, 1995

[54] METHOD FOR DIVIDING A FRAME STRUCTURE IN A MOBILE STATION

[75] Inventor: Bengt Y. Persson, Djursholm, Sweden

[73] Assignee: Telefonaktiebolaget LM Ericsson, Stockholm, Sweden

[21] Appl. No.: 186,095

[22] Filed: Sep. 15, 1993

Related U.S. Application Data

[63] Continuation of Ser. No. 993,810, Dec. 14, 1992, abandoned, which is a continuation of Ser. No. 496,040, Mar. 20, 1990, abandoned.

[30] Foreign Application Priority Data

Nov. 3, 1989 [SE] Sweden .................. 8903680

[51] Int. Cl.$^6$ .............................................. H04J 3/16
[52] U.S. Cl. .................................. 370/95.1; 455/33.3
[58] Field of Search .............. 370/31, 29, 24, 110.1, 370/78, 80, 84, 95.3, 95.1, 95.2, 17, 13; 375/1; 379/58, 59, 60, 63; 455/33.1, 33.4, 53.1, 54.1, 56, 63, 65, 78, 332, 33.3, 154.2, 150.1, 179.1, 62, 67.4, 165.1, 166.2

[56] References Cited

U.S. PATENT DOCUMENTS

| | | | |
|---|---|---|---|
| 2,199,179 | 4/1990 | Koch | 370/29 |
| 3,443,228 | 5/1969 | Brenner et al. | 455/62 |
| 3,532,988 | 10/1970 | Magnuski | 455/62 |
| 3,619,788 | 11/1971 | Giles, Jr. | 455/166.2 |
| 3,983,492 | 9/1976 | Fisher et al. | 455/179.1 |
| 4,069,455 | 1/1978 | Sherman, Jr. | 255/150.1 |
| 4,123,715 | 10/1978 | Fathauer | 455/165.1 |
| 4,190,803 | 2/1980 | Imamura | 455/154.2 |
| 4,430,753 | 2/1984 | Shiratani | 455/52 |
| 4,470,140 | 9/1984 | Coffey | 370/95.1 |
| 4,476,582 | 10/1984 | Strauss et al. | 455/166 |
| 4,513,412 | 4/1985 | Cox | 455/134 |
| 4,641,304 | 2/1987 | Raychaudhuri | 370/95.3 |
| 4,688,213 | 8/1987 | Raychaudhuri | 370/85.2 |
| 4,736,371 | 4/1988 | Tejima et al. | 370/95.1 |
| 4,815,073 | 3/1989 | Grauel et al. | 370/95.1 |
| 4,817,089 | 3/1989 | Pameth et al. | 370/24 |
| 4,851,820 | 7/1989 | Fernandez | 340/825.440 |
| 4,910,791 | 3/1990 | Dickinson et al. | 455/67.4 |
| 4,914,649 | 4/1990 | Schoandeman et al. | 370/95.1 |
| 4,949,335 | 8/1990 | Moore | 370/29 |
| 4,949,395 | 8/1990 | Rydbeck | 370/95.3 |
| 4,972,506 | 11/1990 | Uddenfeldt | 455/33 |
| 5,070,536 | 12/1991 | Mahany et al. | 455/67.4 |
| 5,128,959 | 7/1992 | Bruckert | 375/1 |

FOREIGN PATENT DOCUMENTS

| | | |
|---|---|---|
| 160115 | 3/1989 | Japan . |
| 1195714 | 8/1989 | Japan . |
| 2244402 | 11/1991 | United Kingdom . |

OTHER PUBLICATIONS

TIA Technical Report, "Digital Voice Channel Structure Assuming No Duplex Filter," TIA Technical Subcommittee, TR-45.3 Digital Cellular Standards, Jul. 25-27, 1989, Calgary, pp. 1-3.

Dornstetter et al., "Cellular Efficiency With Slow Frequency Hopping: Analysis of the Digital SFH900 Mobile System," IEEE J. on Selected Areas Of Communication, vol. SAC-5, No. 5, Jun. 1987, pp. 835-848.

"Multiplexing and Muliple Access on the Radio Path," CEPT/CCH GSM Recommendation: 05.02/1, Version 3.2.0, Oct. 12, 1988, pp. 1-33.

Primary Examiner—Benedict V. Safourek
Assistant Examiner—Dang Ton
Attorney, Agent, or Firm—Burns, Doane, Swecker & Mathis

[57] ABSTRACT

A method for dividing a frame structure for a mobile telephone system which operates in half-duplex, i.e. in which the transmission and reception of signals in a mobile takes place within mutually separate time-slots (TS0 and TM0 respectively). Each frame includes three time-slots, each intended for transmission and reception. According to the method, the frame structure is divided so that transmission (TX) first takes place in a transmission time-slot (TS0). Reception (RX) then takes places in a reception time-slot (TM0) which is separate from the transmission time-slot (TS0). Subsequent to reception (RX), the frame structure includes an idle time ($t_1$) which remains until further transmission (TX) takes place in the next-following frame. The method enables the frequency synthesizer (FM) of the mobile in the reception direction to be set to a channel ($f_x$) different to the reception channel ($f_m$) and then to be reset accurately to the reception channel ($f_m$).

4 Claims, 2 Drawing Sheets

("full rate")

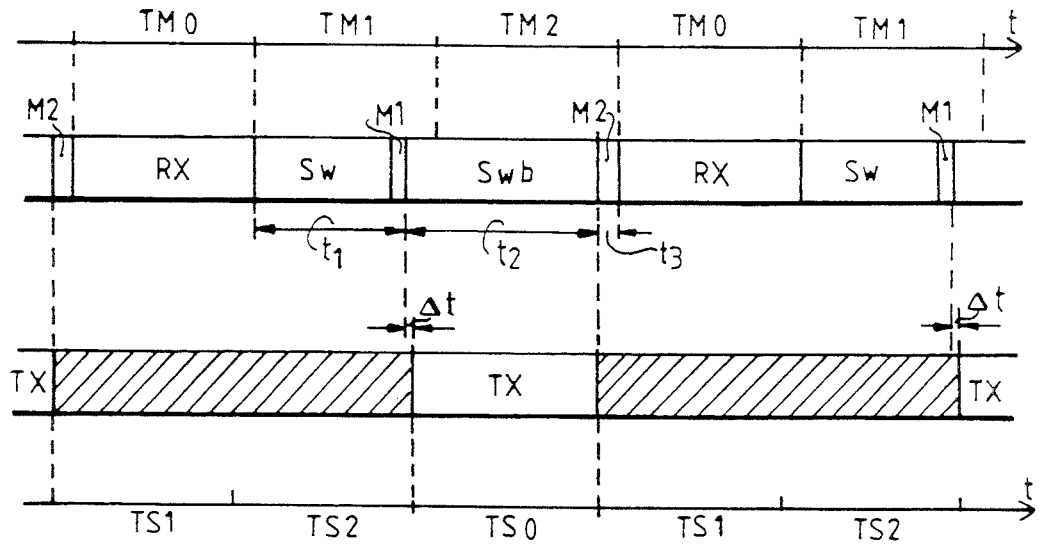
Fig.3 ("full rate")
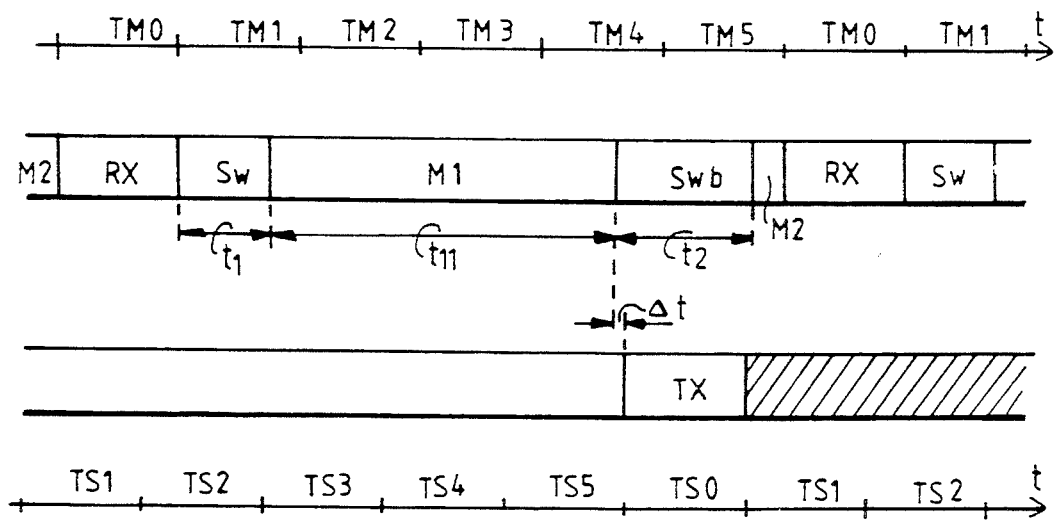
Fig.4 ("half rate")

METHOD FOR DIVIDING A FRAME STRUCTURE IN A MOBILE STATION

This application is a continuation of application Ser. No. 07/993,810, filed Dec. 14, 1992, which is a continuation of application Ser. No. 07/496,040, filed Mar. 20, 1990 now abandoned.

TECHNICAL FIELD

The present invention relates to a method for dividing a frame structure into a transmission part and a reception part when determining channel quality in a mobile station. The mobile station is one of a plurality of such stations in communication with the base station of a mobile telephone system. More specifically, the method is concerned with disposing the reception time-slots included in the frame in a manner which will enable those time-slots which are not in use when receiving to be used for other purposes in an optimum manner with respect to a transmission time-slot in each frame.

BACKGROUND ART

In the case of a mobile telephone system which functions in accordance with the time division multiple access (TDMA) principle, the transmission and reception time-slots are included in so-called frames. One frame can contain, for instance, 10 time-slots, of which some are used to transmit bursts of speech/data signals, where each burst takes-up substantially a complete time-slot. Time-slots can be used to transmit synchronizing information, etc., for example. The mobile station can also utilize vacant or unoccupied time-slots for measuring purposes, e.g. for measuring signal strength over a radio channel other than the channel assigned to the mobile station. The signal strength of channels which belong to another base station can be measured while a time-slot is vacant when so-called hand-over shall take place.

Transmission and reception in the various time-slots can take place either simultaneously or in time-slots which are separated in time. In the former case, reception takes place in a reception time-slot at the same time as transmission takes place in a transmission time-slot, i.e. the two time-slots coincide complete or partially. This requires the provision of a so-called duplex filter in the mobile station, in order to separate mututally transmitted and received signals which have mutually different carrier frequencies.

In the latter of the aforesaid two cases, in which the transmission and reception time-slots are separated in time, the reception circuits of the mobile station are fully disengaged during transmission, and vice versa. No duplex filter is required in this latter case. An example of one such mobile telephone system is described in U.S. Pat. No. 4,817,089 which operates in semiduplex. This known system includes separate frequency synthesizers which are operative to set the carrier frequencies in the transmitting and receiving directions. In known systems which use duplex filters to enable signals to be received and transmitted simultaneously, there is obtained a certain rest or idle period which can be used to determine signal strength.

DISCLOSURE OF INVENTION

The inventive method is concerned with the division of the frame structure when transmitting and receiving signals in a mobile station, this division being such that while time-slots are unoccupied, an effective time can be utilized for determining signal strength and for setting the frequency synthesizer in the transmission and reception paths. The proposed method is based on the fact that the measuring of the signal strength from, e.g. another channel, having a carrier frequency that is different from the carrier frequency for which the frequency synthesizer is set at that particular time (when receiving for instance) does not require the frequency synthesizer to be set to the same degree of accuracy as that required when it is reset to a reception mode. The proposed frame-division is thus intended to create space for setting the reception-side of the frequency synthesizer and is meant to provide more time for setting the reception-side of the synthesizer when the return to the reception mode is to take place subsequent to the synethesizer having been set to another carrier frequency for measuring purposes. The method is characterized by the features set forth in claim 4.

BRIEF DESCRIPTION OF THE DRAWINGS

The inventive method will now be described in more detail with reference to the accompanying drawings, in which

FIG. 3 illustrates a frame structure for the transmitting and receiving sides of a mobile station according to the proposed method for "full rate"; and FIG. 4 illustrates another frame structure according to the proposed method for so-called "half rate".

BEST MODES FOR CARRYING OUT THE INVENTION

Figure 1:
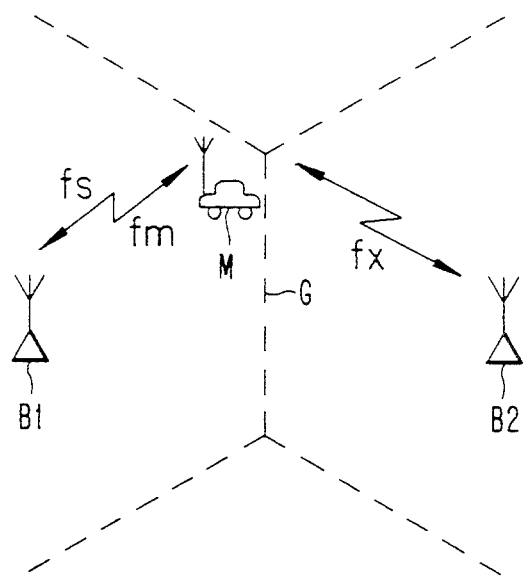
FIG. 1 illustrates schematically two neighbouring or conterminal base stations and a mobile station.

FIG. 1 illustrates in general two base stations B1 and B2 and a mobile M which form part of a mobile telephone system. The mobile M communicates with the base station B1 in half-duplex, by transmitting a burst of speech/data during a given time-slot in each frame and receiving a burst during another time-slot in the same frame. Transmission and reception time-slots for the mobile M are transmitted by means of a respective given carrier frequency $f_s$ and $f_m$.

When the mobile M approaches the limit G of the area covered by the other base station B2, the mobile M measures the strength of the control signal from said base station B2. This signal is assumed to have the carrier frequency $f_x$. The signal is measured with the intention of preparing for a "hand-over" of mobile communication from the base station B1 to the base station B2. This measuring procedure requires a given time-space in each frame in the mobile M-base station B1 communication.

Figure 2:
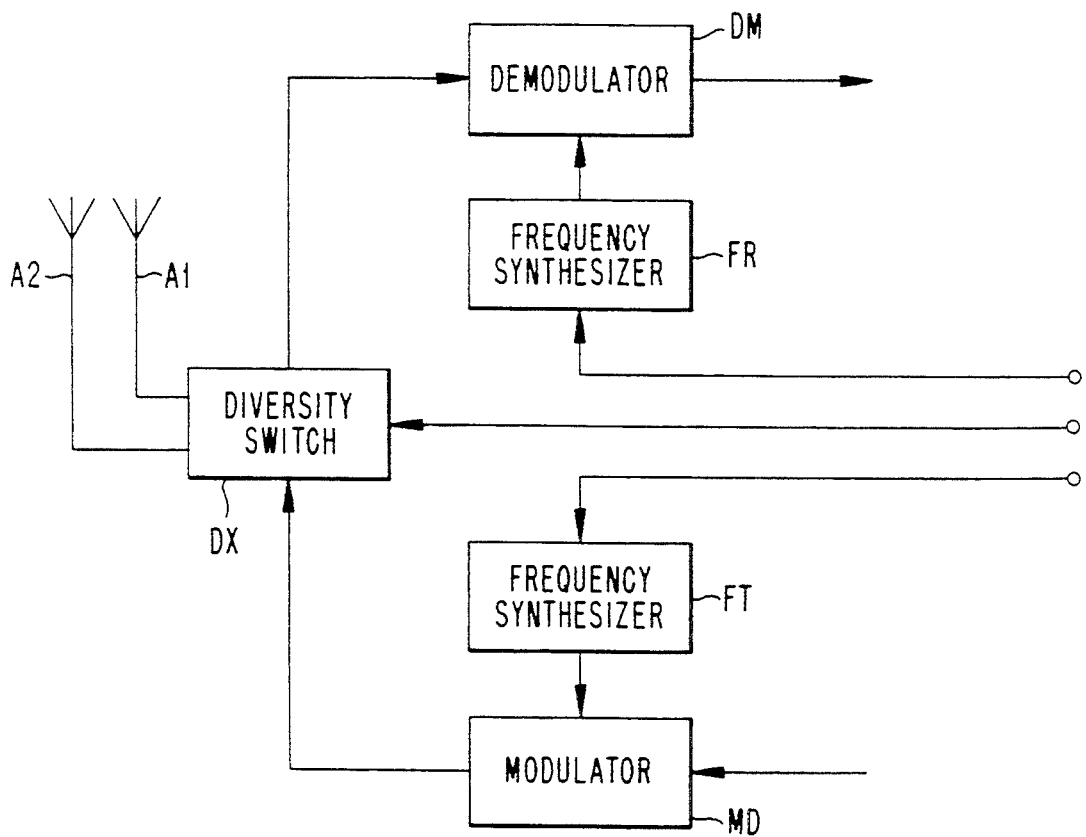
FIG. 2 is a block schematic illustrating part of the transmitting and receiving path of the mobile station.

FIG. 2 is a simplified block-diagram showing known input and output units of the mobile M. The mobile M also hase two antennas A1 and A2, each of which can be used for transmission and reception purposes, depending on the propagation conditions prevailing in the surrounding environment. A diversity switch DX is placed between the transmitting and receiving paths for the purpose of switching to the antenna which will give the best reception. The switch DX is also assumed to switch between transmission and reception.

Provided in the reception path is a demodulator DM which is operative to demodulate received signals and to transmit a continuous base-band signal to subsequent receiver circuits in a known manner (not shown) within the receiver time-slot.

The demodulator DM is connected to a frequency synthesizer FR which produces the carrier frequency $f_m$ required for said demodulation.

Analogously with the receiver-side of the mobile, the transmitter-side thereof includes a modulator MD which is operative to modulate the signals transmitted from a burst generator (not shown) with the transmission-time-slot having a carrier frequency $f_s$, which may be the same frequency as the received carrier-frequency. The frequency synthesizer on the transmission side is referenced FT.

In accordance with the proposed method, the units DX, FR and FT are controlled from the control unit of the mobile in a manner described hereinafter with reference to FIGS. 3 and 4. The time-slots intended for transmission and reception, however, are mutually separated within each frame, which protects the two transmission paths against cross-talk in accordance with the half-duplex principle.

The frequency synthesizer FR shall thus be set to the carrier frequency $f_m$ applicable when receiving during the reception time-slot, and the synthesizer FT shall be set to the carrier frequency $f_s$ during the transmission time-slot. In order to enable detection to be effected with precision, it is necessary to set the synthesizer accurately during both transmission and reception. When the mobile is intended to measure signal strength on the basis of a control signal from the base station B2 transmitted with the carrier frequency $f_x$, the synthesizer FR shall be set to this frequency during a given unoccupied time-slot in the frame. This synthesizer setting, however, need not be of the same degree of accuracy as that required when setting the synthesizer for reception purposes. This circumstance is utilized in the proposed method to obtain an optimum time-space for setting the frequency synthesizers.

FIG. 3 illustrates a frame structure in accordance with the proposed method for those instances when the mobile station M operates at so-called "full rate" and has three time-slots in each frame.

The time-slots in the reception frame are designated TM0, TM1, TM2 and the time-slots in the transmission frame are designated TS0, TS1 and TS2. In the frame structure illustrated in FIG. 3, the transmission frame is slightly displaced in relation to the receiving frame, i.e. the reception time-slot TM0 commences somewhat later than the corresponding transmission time-slot TS0. An incoming burst RX of data or speech is received during the time-slot TM0. During the next reception time-slot TM1 and during a time interval $t_1 + \Delta t$ until commencement of the transmission time-slot TS0, there is found in the receiver an idle-time which can be utilized for purposes other than receiving speech/data from the base station. According to the inventive method, this idle-time is utilized to set the mobile-station frequency-synethesizer FR in the receiving path to another desired frequency $f_x$, for instance to the carrier frequency of a channel from a neighbouring base station B2, and to effect measurement M1 of the signal strength from this base station. The time interval $t_1$ taken for switching, Sw, the frequency synthesizer will be greater or smaller depending on the time-displacement of the frames. However, since the measuring process M1 is solely intended to measure signal strength (of frequency $f_x$), the accuracy to which the frequency synthesizer FR is set need be far less stringent than when setting the synthesizer to receive speech/data. The interval Sw+M1 is selected so that a given time margin $\Delta t$ is found to the commencement of a transmission time-slot TS0. The time margin $\Delta t$ is selected with respect to the propagation time of the signals between mobile and base, this time period being dependent on the mobile-base distance.

During the transmission time-slot TS0, there is found a residual time-space in the reception time-slot TM1 and a given space during the reception time-slot TM2. When reception is again to take place during the time-slot TM0, it is necessary to set the frequency synthesizer FR in the reception path extremely accurately to the previous frequency $f_m$. During the time interval Swb of duration $t_2$, the frequency synthesizer is therefore switched from the frequency $f_x$ used during the measuring procedure M1 to the reception frequency $f_m$. This time-interval is normally of sufficient duration to enable the frequency synthesizer FR to be set accurately to the reception frequency. The part $t_3$ of the time-slot TM2 which remains until commencement of the time-slot TM0 (and thus reception takes place) is therefore used to carry out a measurement on the reception channel $f_m$, for instance with the intention of selecting one of the two receiver antennas A1, A2 according to FIG. 1, so-called diversity measuring. The time interval $t_3$ is therewith equal to the time in which the reception frame is displaced relative to the transmitting frame.

No TX transmission takes place during the time-slots TS1 and TS2. The measuring process M1 must be terminated before transmission TX commences, since the measuring procedure M1 is carried out on incoming signals to the mobile station which operate in half-duplex. Furthermore, transmission TX must be terminated prior to commencing the measuring procedure M2, since this measuring procedure is also carried out on a reception channel, although this channel is now the same channel as the channel intended for receiving speech/data. Finally, a time margin $\Delta t$ must be provided for compensation of the propagation time of the radio signals in dependence on the distance of the mobile M from the base station B1.

Examples of numerical values for time division of a frame for a "full-rate" channel are given below. The frame length is 20 ms.

|  | Transmission | Reception | Time |
| --- | --- | --- | --- |
| Power measuring M2 for the diversity |  | X | 0.8 |
| Burst reception RX |  | X | 6.5 |
| neighbouring base station (B2) |  | X | 5.4 |
| Power measuring M1 prior to "hand-off" |  | X | 0.2 |
| Time margin $\Delta t$ | X |  | 0.3 |
| Time upto full power | X |  | 0.1 |
| Burst transmission | X |  | 6.5 |
| Time down to low power | X |  | 0.2 |

The time taken to receive and transmit a burst is shorter than a time-slot, since the up time and down time to/from full power is calculated within the duration of a time-slot.

FIG. 4 illustrates a frame structure according to the proposed method in the case when the mobile station M operates at so-called "half rate", i.e. the burst repetition time is twice as long as the repetition time of "full-rate".

For practical reasons, however, the time-slots illustrated in FIG. 4 have been drawn slightly shorter than the time-slots in FIG. 3.

Since the frame length is now twice as large, one frame will include 6 time-slots. Subsequent to receiving RX during time-slot TM0, the frequency synthesizer FM is switched Sw to the frequency $f_x$ from a neighbouring base station BS2 during the time interval $t_1$, for the purpose of measuring the signal strength of said base station. Measurement of said signal strength is carried out during the interval $t_{11}$, until transmission is to be carried out. In this case, the interval $t_{11}$ is much longer than the $\Delta t$ before transmission $T_x$ can take place in the time-slot TS0. As corresponding time interval for a "full-rate" channel. The measuring procedure shall be terminated at a given time margin $\Delta t$ before transmission $T_x$ can take place in the time-slot TS0. As with the case of a full-rate channel according to FIG. 3, the synthesizer FM is, at the same time, switched Swb back to the frequency $f_m$ for reception from the base station BS1.

I claim:

1. A method of organizing a reception frame structure, said method comprising the steps of:

providing, in a mobile station of a mobile telephone system, a reception frame structure including a number of reception time slots in relation to a given transmission frame structure including the same number of transmission time slots as said number of reception time slots;

operating mode telephone system in a half-duplex mode; and displacing the reception time slots of said reception frame structure a determined time offset interval less than half a time slot relative to the transmission time slots in said transmission frame structure, wherein a given transmission from said mobile station in a given transmission time slot of the transmission frame structure is followed by reception in a reception time slot of the reception frame structure, and, thereafter, a given idle time of substantially the same time duration as the difference between a time slot and said determined time offset interval follows said reception frame structure until transmission is recommenced in a transmission time slot of the next following transmission frame structure.

2. A method according to claim 1, wherein said idle time is terminated by a given first time interval of short duration, as compared with the length of said idle time, prior to the beginning of the time slot of said next following transmission frame.

3. A method of controlling a frequency synthesizer for a reception channel in a mobile station of a mobile telephone system which operates in a half-duplex mode, the mobile station using a transmission frame structure and a reception frame structure including a number of reception time slots in relation to a given transmission frame structure including the same number of transmission time slots as said number of reception time slots, the reception time slots of said reception frame structure being displaced a certain time interval relative to the transmission time slots in said transmission frame structure, wherein a given transmission from said mobile station in a given transmission time slot of the transmission frame structure is followed by reception in a reception time slot of the reception frame structure, and, thereafter, a given idle time follows in said reception time slot until transmission is recommenced in a transmission time slot of the next following transmission frame structure, said method including a) setting the frequency synthesizer from a give first frequency used when receiving radio signals over a first channel to a second frequency and effecting a measurement on the channel corresponding to said second frequency during said idle time, and b) resetting the :frequency synthesizer from said second frequency to said first frequency during a time period which substantially coincides with the time slot of a corresponding transmission frame.

4. A method according to claim 3, further comprising the step of:

c) reserving a given second time interval between a time slot in a transmission frame and a time slot in the corresponding reception frame during which a measurement over the first channel is carried out on the first frequency.

* * * * *

UNITED STATES PATENT AND TRADEMARK OFFICE
CERTIFICATE OF CORRECTION

PATENT NO. : 5,442,635

DATED : Aug. 15, 1995

INVENTOR(S) : Bengt Y. PERSSON

It is certified that error appears in the above-identified patent and that said Letters Patent is hereby corrected as shown below:

Column 5, line 31, delete "mode" and insert --the mobile--.

Signed and Sealed this

Seventeenth Day of September, 1996

*Attest:*

BRUCE LEHMAN

*Attesting Officer*   Commissioner of Patents and Trademarks